US008713018B2

(12) United States Patent
Knight et al.

(10) Patent No.: US 8,713,018 B2
(45) Date of Patent: Apr. 29, 2014

(54) SYSTEM AND METHOD FOR DISPLAYING RELATIONSHIPS BETWEEN ELECTRONICALLY STORED INFORMATION TO PROVIDE CLASSIFICATION SUGGESTIONS VIA INCLUSION

(75) Inventors: William C. Knight, Bainbridge Island, WA (US); Nicholas I. Nussbaum, Seattle, WA (US)

(73) Assignee: FTI Consulting, Inc., Annapolis, MD (US)

( * ) Notice: Subject to any disclaimer, the term of this patent is extended or adjusted under 35 U.S.C. 154(b) by 320 days.

(21) Appl. No.: 12/833,860

(22) Filed: Jul. 9, 2010

(65) Prior Publication Data

US 2011/0029526 A1  Feb. 3, 2011

Related U.S. Application Data

(60) Provisional application No. 61/229,216, filed on Jul. 28, 2009, provisional application No. 61/236,490, filed on Aug. 24, 2009.

(51) Int. Cl.
*G06F 17/30* (2006.01)
(52) U.S. Cl.
USPC .......................................... 707/737; 707/736
(58) Field of Classification Search
None
See application file for complete search history.

(56) References Cited

U.S. PATENT DOCUMENTS

| 3,416,150 A | 12/1968 | Lindberg |
| 3,426,210 A | 2/1969 | Agin |
| 3,668,658 A | 6/1972 | Flores et al. |
| 4,893,253 A | 1/1990 | Lodder |
| 5,056,021 A | 10/1991 | Ausborn |
| 5,121,338 A | 6/1992 | Lodder |
| 5,133,067 A | 7/1992 | Hara et al. |

(Continued)

FOREIGN PATENT DOCUMENTS

| EP | 0886227 | 12/1998 |
| EP | 1024437 | 8/2000 |

(Continued)

OTHER PUBLICATIONS

O'Neill et al., "DISCO: Intelligent Help for Document Review," 12th International Conference on Artificial Intelligence and Law, Barcelona, Spain, Jun. 8, 2009, pp. 1-10, ICAIL 2009, Association For Computing Machinery, Red Hook, New York (Online); XP 002607216.

McNee, "Meeting User Information Needs in Recommender Systems," Ph.D. Dissertation, University of Minnesota-Twin Cities, Jun. 2006.

Slaney, M., et al., "Multimedia Edges: Finding Hierarchy in all Dimensions" Proc. 9-th ACM Intl. Cont. on Multimedia, pp. 29-40, ISBN. 1-58113-394-4, Sep. 30, 2001, XP002295016 Ottawa (Sep. 3, 2001).

(Continued)

*Primary Examiner* — Yuk Ting Choi
(74) *Attorney, Agent, or Firm* — Patrick J. S. Inouye; Krista A. Wittman; Leonid Kisselev

(57) ABSTRACT

A system and for providing reference documents as a suggestion for classifying uncoded documents is provided. A set of reference electronically stored information items, each associated with a classification code, is designated. One or more of the reference electronically stored information items is combined with a set of uncoded electronically stored information items. Clusters of the uncoded electronically stored information items and the one or more reference electronically stored information items are generated. Relationships between the uncoded electronically stored information items and the one or more reference electronically stored information items in at least one cluster are visually depicted as suggestions for classifying the uncoded electronically stored information items in that cluster.

24 Claims, 9 Drawing Sheets

(56) References Cited

U.S. PATENT DOCUMENTS

| | | | |
|---|---|---|---|
| 5,278,980 | A | 1/1994 | Pedersen et al. |
| 5,371,673 | A | 12/1994 | Fan |
| 5,442,778 | A | 8/1995 | Pedersen et al. |
| 5,477,451 | A | 12/1995 | Brown et al. |
| 5,488,725 | A | 1/1996 | Turtle et al. |
| 5,524,177 | A | 6/1996 | Suzuoka |
| 5,528,735 | A | 6/1996 | Strasnick et al. |
| 5,619,632 | A | 4/1997 | Lamping et al. |
| 5,619,709 | A | 4/1997 | Caid et al. |
| 5,635,929 | A | 6/1997 | Rabowsky et al. |
| 5,649,193 | A | 7/1997 | Sumita et al. |
| 5,675,819 | A | 10/1997 | Schuetze |
| 5,696,962 | A | 12/1997 | Kupiec |
| 5,737,734 | A | 4/1998 | Schultz |
| 5,754,938 | A | 5/1998 | Herz et al. |
| 5,794,236 | A | 8/1998 | Mehrle |
| 5,799,276 | A | 8/1998 | Komissarchik et al. |
| 5,819,258 | A | 10/1998 | Vaithyanathan et al. |
| 5,842,203 | A | 11/1998 | D'Elena et al. |
| 5,844,991 | A | 12/1998 | Hochberg et al. |
| 5,857,179 | A | 1/1999 | Vaithyanathan et al. |
| 5,860,136 | A | 1/1999 | Fenner |
| 5,862,325 | A | 1/1999 | Reed et al. |
| 5,864,846 | A | 1/1999 | Voorhees et al. |
| 5,864,871 | A | 1/1999 | Kitain et al. |
| 5,867,799 | A | 2/1999 | Lang et al. |
| 5,870,740 | A | 2/1999 | Rose et al. |
| 5,909,677 | A | 6/1999 | Broder et al. |
| 5,915,024 | A | 6/1999 | Kitaori et al. |
| 5,920,854 | A | 7/1999 | Kirsch et al. |
| 5,924,105 | A | 7/1999 | Punch et al. |
| 5,940,821 | A | 8/1999 | Wical |
| 5,950,146 | A | 9/1999 | Vapnik |
| 5,950,189 | A | 9/1999 | Cohen et al. |
| 5,966,126 | A | 10/1999 | Szabo |
| 5,987,446 | A | 11/1999 | Corey et al. |
| 6,006,221 | A | 12/1999 | Liddy et al. |
| 6,012,053 | A | 1/2000 | Pant et al. |
| 6,026,397 | A | 2/2000 | Sheppard |
| 6,038,574 | A | 3/2000 | Pitkow et al. |
| 6,070,133 | A | 5/2000 | Brewster et al. |
| 6,089,742 | A | 7/2000 | Warmerdam et al. |
| 6,092,059 | A | 7/2000 | Straforini et al. |
| 6,094,649 | A | 7/2000 | Bowen et al. |
| 6,100,901 | A | 8/2000 | Mohda et al. |
| 6,119,124 | A | 9/2000 | Broder et al. |
| 6,122,628 | A | 9/2000 | Castelli et al. |
| 6,137,499 | A | 10/2000 | Tesler |
| 6,137,545 | A | 10/2000 | Patel et al. |
| 6,137,911 | A | 10/2000 | Zhilyaev |
| 6,148,102 | A | 11/2000 | Stolin |
| 6,154,219 | A | 11/2000 | Wiley et al. |
| 6,167,368 | A | 12/2000 | Wacholder |
| 6,173,275 | B1 | 1/2001 | Caid et al. |
| 6,202,064 | B1 | 3/2001 | Julliard |
| 6,216,123 | B1 | 4/2001 | Robertson et al. |
| 6,243,713 | B1 | 6/2001 | Nelson et al. |
| 6,243,724 | B1 | 6/2001 | Mander et al. |
| 6,260,038 | B1 | 7/2001 | Martin et al. |
| 6,326,962 | B1 | 12/2001 | Szabo |
| 6,338,062 | B1 | 1/2002 | Liu |
| 6,345,243 | B1 | 2/2002 | Clark |
| 6,349,296 | B1 | 2/2002 | Broder et al. |
| 6,349,307 | B1 | 2/2002 | Chen |
| 6,360,227 | B1 | 3/2002 | Aggarwal et al. |
| 6,363,374 | B1 | 3/2002 | Corston-Oliver et al. |
| 6,377,287 | B1 | 4/2002 | Hao et al. |
| 6,381,601 | B1 | 4/2002 | Fujiwara et al. |
| 6,389,433 | B1 | 5/2002 | Bolonsky et al. |
| 6,389,436 | B1 | 5/2002 | Chakrabarti et al. |
| 6,408,294 | B1 | 6/2002 | Getchius et al. |
| 6,414,677 | B1 | 7/2002 | Robertson et al. |
| 6,415,283 | B1 | 7/2002 | Conklin |
| 6,418,431 | B1 | 7/2002 | Mahajan et al. |
| 6,421,709 | B1 | 7/2002 | McCormick et al. |
| 6,438,537 | B1 | 8/2002 | Netz et al. |
| 6,438,564 | B1 | 8/2002 | Morton et al. |
| 6,442,592 | B1 | 8/2002 | Alumbaugh et al. |
| 6,446,061 | B1 | 9/2002 | Doerre et al. |
| 6,449,612 | B1 | 9/2002 | Bradley et al. |
| 6,453,327 | B1 | 9/2002 | Nielsen |
| 6,460,034 | B1 | 10/2002 | Wical |
| 6,470,307 | B1 | 10/2002 | Turney |
| 6,480,843 | B2 | 11/2002 | Li |
| 6,480,885 | B1 | 11/2002 | Olivier |
| 6,484,168 | B1 | 11/2002 | Pennock et al. |
| 6,484,196 | B1 | 11/2002 | Maurille |
| 6,493,703 | B1 | 12/2002 | Knight et al. |
| 6,496,822 | B2 | 12/2002 | Rosenfelt et al. |
| 6,502,081 | B1 | 12/2002 | Wiltshire, Jr. et al. |
| 6,507,847 | B1 | 1/2003 | Fleischman |
| 6,510,406 | B1 | 1/2003 | Marchisio |
| 6,519,580 | B1 | 2/2003 | Johnson et al. |
| 6,523,026 | B1 | 2/2003 | Gillis |
| 6,523,063 | B1 | 2/2003 | Miller et al. |
| 6,542,889 | B1 | 4/2003 | Aggarwal et al. |
| 6,544,123 | B1 | 4/2003 | Hiromichi et al. |
| 6,549,957 | B1 | 4/2003 | Hanson et al. |
| 6,560,597 | B1 | 5/2003 | Dhillon et al. |
| 6,571,225 | B1 | 5/2003 | Oles et al. |
| 6,584,564 | B2 | 6/2003 | Olkin et al. |
| 6,594,658 | B2 | 7/2003 | Woods |
| 6,598,054 | B2 | 7/2003 | Schuetze et al. |
| 6,606,625 | B1 | 8/2003 | Muslea et al. |
| 6,611,825 | B1 | 8/2003 | Billheimer et al. |
| 6,628,304 | B2 | 9/2003 | Mitchell et al. |
| 6,629,097 | B1 | 9/2003 | Keith |
| 6,640,009 | B2 | 10/2003 | Zlotnick |
| 6,651,057 | B1 | 11/2003 | Jin et al. |
| 6,654,739 | B1 | 11/2003 | Apte et al. |
| 6,658,423 | B1 | 12/2003 | Pugh et al. |
| 6,675,159 | B1 | 1/2004 | Lin et al. |
| 6,675,164 | B2 | 1/2004 | Kamath et al. |
| 6,678,705 | B1 | 1/2004 | Berchtold et al. |
| 6,684,205 | B1 | 1/2004 | Modha et al. |
| 6,697,998 | B1 | 2/2004 | Damerau et al. |
| 6,701,305 | B1 | 3/2004 | Holt et al. |
| 6,711,585 | B1 | 3/2004 | Copperman et al. |
| 6,714,929 | B1 | 3/2004 | Micaelian et al. |
| 6,735,578 | B2 | 5/2004 | Shetty et al. |
| 6,738,759 | B1 | 5/2004 | Wheeler et al. |
| 6,747,646 | B2 | 6/2004 | Gueziec et al. |
| 6,751,628 | B2 | 6/2004 | Coady |
| 6,757,646 | B2 | 6/2004 | Marchisio |
| 6,785,679 | B1 | 8/2004 | Dane et al. |
| 6,804,665 | B2 | 10/2004 | Kreulen et al. |
| 6,816,175 | B1 | 11/2004 | Hamp et al. |
| 6,819,344 | B2 | 11/2004 | Robbins |
| 6,823,333 | B2 | 11/2004 | McGreevy |
| 6,841,321 | B2 | 1/2005 | Matsumoto et al. |
| 6,847,966 | B1 | 1/2005 | Sommer et al. |
| 6,862,710 | B1 | 3/2005 | Marchisio |
| 6,879,332 | B2 | 4/2005 | Decombe |
| 6,883,001 | B2 | 4/2005 | Abe |
| 6,886,010 | B2 | 4/2005 | Kostoff |
| 6,888,584 | B2 | 5/2005 | Suzuki et al. |
| 6,915,308 | B1 | 7/2005 | Evans et al. |
| 6,922,699 | B2 | 7/2005 | Schuetze et al. |
| 6,941,325 | B1 | 9/2005 | Benitez et al. |
| 6,970,881 | B1 | 11/2005 | Mohan et al. |
| 6,978,419 | B1 | 12/2005 | Kantrowitz |
| 6,990,238 | B1 | 1/2006 | Saffer et al. |
| 6,993,535 | B2 | 1/2006 | Bolle et al. |
| 6,996,575 | B2 | 2/2006 | Cox et al. |
| 7,003,551 | B2 | 2/2006 | Malik |
| 7,013,435 | B2 | 3/2006 | Gallo et al. |
| 7,020,645 | B2 | 3/2006 | Bisbee et al. |
| 7,039,856 | B2 | 5/2006 | Peairs et al. |
| 7,051,017 | B2 | 5/2006 | Marchisio |
| 7,054,870 | B2 | 5/2006 | Holbrook |
| 7,080,320 | B2 | 7/2006 | Ono |
| 7,096,431 | B2 | 8/2006 | Tambata et al. |
| 7,099,819 | B2 | 8/2006 | Sakai et al. |
| 7,107,266 | B1 | 9/2006 | Breyman et al. |

(56) References Cited

U.S. PATENT DOCUMENTS

| | | | |
|---|---|---|---|
| 7,117,151 B2 * | 10/2006 | Iwahashi et al. | 704/233 |
| 7,117,246 B2 | 10/2006 | Christenson et al. | |
| 7,130,807 B1 | 10/2006 | Mikurak | |
| 7,137,075 B2 | 11/2006 | Hoshito et al. | |
| 7,139,739 B2 | 11/2006 | Agrafiotis et al. | |
| 7,146,361 B2 | 12/2006 | Broder et al. | |
| 7,155,668 B2 | 12/2006 | Holland et al. | |
| 7,188,107 B2 | 3/2007 | Moon et al. | |
| 7,188,117 B2 | 3/2007 | Farahat et al. | |
| 7,194,458 B1 | 3/2007 | Micaelian et al. | |
| 7,194,483 B1 | 3/2007 | Mohan et al. | |
| 7,197,497 B2 | 3/2007 | Cossock | |
| 7,209,949 B2 | 4/2007 | Mousseau et al. | |
| 7,233,886 B2 | 6/2007 | Wegerich et al. | |
| 7,233,940 B2 | 6/2007 | Bamberger et al. | |
| 7,239,986 B2 | 7/2007 | Golub et al. | |
| 7,240,199 B2 | 7/2007 | Tomkow | |
| 7,246,113 B2 | 7/2007 | Cheetham et al. | |
| 7,251,637 B1 | 7/2007 | Caid et al. | |
| 7,266,365 B2 | 9/2007 | Ferguson et al. | |
| 7,266,545 B2 | 9/2007 | Bergman et al. | |
| 7,269,598 B2 | 9/2007 | Marchisio | |
| 7,271,801 B2 | 9/2007 | Toyozawa et al. | |
| 7,277,919 B1 | 10/2007 | Dohono et al. | |
| 7,325,127 B2 | 1/2008 | Olkin et al. | |
| 7,353,204 B2 | 4/2008 | Liu | |
| 7,359,894 B1 | 4/2008 | Liebman et al. | |
| 7,363,243 B2 | 4/2008 | Arnett et al. | |
| 7,366,759 B2 | 4/2008 | Trevithick et al. | |
| 7,373,612 B2 | 5/2008 | Risch et al. | |
| 7,376,635 B1 * | 5/2008 | Porcari et al. | 707/999.001 |
| 7,379,913 B2 | 5/2008 | Steele et al. | |
| 7,383,282 B2 | 6/2008 | Whitehead et al. | |
| 7,401,087 B2 | 7/2008 | Copperman et al. | |
| 7,412,462 B2 | 8/2008 | Margolus et al. | |
| 7,418,397 B2 | 8/2008 | Kojima et al. | |
| 7,430,717 B1 | 9/2008 | Spangler | |
| 7,433,893 B2 | 10/2008 | Lowry | |
| 7,440,662 B2 | 10/2008 | Antona et al. | |
| 7,444,356 B2 | 10/2008 | Calistri-Yeh et al. | |
| 7,457,948 B1 | 11/2008 | Bilicksa et al. | |
| 7,472,110 B2 | 12/2008 | Achlioptas | |
| 7,490,092 B2 | 2/2009 | Morton et al. | |
| 7,509,256 B2 * | 3/2009 | Iwahashi et al. | 704/233 |
| 7,516,419 B2 | 4/2009 | Petro et al. | |
| 7,519,565 B2 | 4/2009 | Prakash et al. | |
| 7,523,349 B2 | 4/2009 | Barras | |
| 7,558,769 B2 | 7/2009 | Scott et al. | |
| 7,571,177 B2 | 8/2009 | Damle | |
| 7,574,409 B2 | 8/2009 | Patinkin | |
| 7,584,221 B2 | 9/2009 | Robertson et al. | |
| 7,639,868 B1 | 12/2009 | Regli et al. | |
| 7,640,219 B2 | 12/2009 | Perrizo | |
| 7,647,345 B2 | 1/2010 | Trespess et al. | |
| 7,668,376 B2 | 2/2010 | Lin et al. | |
| 7,698,167 B2 | 4/2010 | Batham et al. | |
| 7,716,223 B2 | 5/2010 | Haveliwala et al. | |
| 7,743,059 B2 | 6/2010 | Chan et al. | |
| 7,761,447 B2 | 7/2010 | Brill et al. | |
| 7,801,841 B2 | 9/2010 | Mishra et al. | |
| 7,885,901 B2 | 2/2011 | Hull et al. | |
| 7,971,150 B2 | 6/2011 | Raskutti et al. | |
| 8,010,466 B2 | 8/2011 | Patinkin | |
| 8,010,534 B2 | 8/2011 | Roitblat et al. | |
| 8,165,974 B2 | 4/2012 | Privault et al. | |
| 2002/0032735 A1 | 3/2002 | Burnstein et al. | |
| 2002/0065912 A1 | 5/2002 | Catchpole et al. | |
| 2002/0078044 A1 | 6/2002 | Song et al. | |
| 2002/0078090 A1 | 6/2002 | Hwang et al. | |
| 2002/0122543 A1 | 9/2002 | Rowen | |
| 2002/0184193 A1 | 12/2002 | Cohen | |
| 2003/0046311 A1 | 3/2003 | Baidya et al. | |
| 2003/0130991 A1 | 7/2003 | Reijerse et al. | |
| 2003/0172048 A1 | 9/2003 | Kauffman | |
| 2003/0174179 A1 * | 9/2003 | Suermondt et al. | 345/853 |
| 2004/0024739 A1 | 2/2004 | Copperman et al. | |
| 2004/0024755 A1 | 2/2004 | Rickard | |
| 2004/0034633 A1 | 2/2004 | Rickard | |
| 2004/0205482 A1 | 10/2004 | Basu et al. | |
| 2004/0205578 A1 | 10/2004 | Wolf et al. | |
| 2004/0215608 A1 | 10/2004 | Gourlay | |
| 2004/0243556 A1 | 12/2004 | Ferrucci et al. | |
| 2005/0025357 A1 | 2/2005 | Landwehr et al. | |
| 2005/0097435 A1 | 5/2005 | Prakash et al. | |
| 2005/0171772 A1 * | 8/2005 | Iwahashi et al. | 704/240 |
| 2005/0203924 A1 | 9/2005 | Rosenberg | |
| 2005/0283473 A1 | 12/2005 | Rousso et al. | |
| 2006/0008151 A1 | 1/2006 | Lin et al. | |
| 2006/0021009 A1 | 1/2006 | Lunt | |
| 2006/0053382 A1 | 3/2006 | Gardner et al. | |
| 2006/0122974 A1 | 6/2006 | Perisic | |
| 2006/0122997 A1 | 6/2006 | Lin | |
| 2007/0020642 A1 | 1/2007 | Deng et al. | |
| 2007/0043774 A1 * | 2/2007 | Davis et al. | 707/200 |
| 2007/0044032 A1 | 2/2007 | Mollitor et al. | |
| 2007/0112758 A1 | 5/2007 | Livaditis | |
| 2007/0150801 A1 | 6/2007 | Chidlovskii et al. | |
| 2007/0214133 A1 | 9/2007 | Liberty et al. | |
| 2007/0288445 A1 | 12/2007 | Kraftsow | |
| 2008/0005081 A1 | 1/2008 | Green et al. | |
| 2008/0140643 A1 | 6/2008 | Ismalon | |
| 2008/0183855 A1 | 7/2008 | Agarwal et al. | |
| 2008/0189273 A1 | 8/2008 | Kraftsow | |
| 2008/0215427 A1 | 9/2008 | Kawada et al. | |
| 2008/0228675 A1 | 9/2008 | Daffy et al. | |
| 2009/0041329 A1 | 2/2009 | Nordell et al. | |
| 2009/0043797 A1 | 2/2009 | Dorie et al. | |
| 2009/0049017 A1 | 2/2009 | Gross | |
| 2009/0097733 A1 | 4/2009 | Hero et al. | |
| 2009/0106239 A1 | 4/2009 | Getner et al. | |
| 2009/0222444 A1 | 9/2009 | Chowdhury et al. | |
| 2009/0228499 A1 | 9/2009 | Schmidtler et al. | |
| 2009/0228811 A1 | 9/2009 | Adams et al. | |
| 2010/0100539 A1 | 4/2010 | Davis et al. | |
| 2010/0198802 A1 | 8/2010 | Kraftsow | |
| 2010/0250477 A1 | 9/2010 | Yadav | |
| 2010/0262571 A1 | 10/2010 | Schmidtler et al. | |
| 2010/0268661 A1 | 10/2010 | Levy et al. | |
| 2012/0124034 A1 | 5/2012 | Jing et al. | |

FOREIGN PATENT DOCUMENTS

| | | |
|---|---|---|
| EP | 1049030 | 11/2000 |
| WO | WO 0067162 | 11/2000 |
| WO | 03052627 | 6/2003 |
| WO | 03060766 | 7/2003 |
| WO | WO 2005073881 | 8/2005 |
| WO | 2006008733 | 1/2006 |

OTHER PUBLICATIONS

Strehl et al., "Cluster Ensembles—A Knowledge Reuse Framework for Combining Partitioning," Journal of Machine Learning Research, MIT Press, Cambridge, MA, US, ISSN: 1533-7928, vol. 3, No. 12, pp. 583-617, XP002390603 (Dec. 2002).

Sullivan, Dan., "Document Warehousing and Text Mining: Techniques for Improving Business Operations, Marketing and Sales," Ch. 1-3, John Wiley & Sons, New York, NY (2001).

V. Faber, "Clustering and the Continuous K-Means Algorithm," Los Alamos Science, The Laboratory, Los Alamos, NM, US, No. 22, Jan. 1, 1994, pp. 138-144.

Wang et al., "Learning text classifier using the domain concept hierarchy," Communications, Circuits and Systems and West Sino Expositions, IEEE 2002 International Conference on Jun. 29-Jul. 1, 2002, Piscataway, NJ, USA, IEEE, vol. 2, pp. 1230-1234 (2002).

Whiting et al., "Image Quantization: Statistics and Modeling," SPIE Conference of Physics of Medical Imaging, San Diego, CA, USA, vol. 3336, pp. 260-271 (Feb. 1998).

Anna Sachinopoulou, "Multidimensional Visualization," Technical Research Centre of Finland, Espoo 2001, VTT Research Notes 2114, pp. 1-37 (2001).

B.B. Hubbard, "The World According the Wavelet: The Story of a Mathematical Technique in the Making," AK Peters (2nd ed.), pp. 227-229, Massachusetts, USA (1998).

(56) References Cited

OTHER PUBLICATIONS

Baeza-Yates et al., "Modern Information Retrieval," Ch. 2 "Modeling," Modern Information Retrieval, Harlow: Addison-Wesley, Great Britain 1999, pp. 18-71 (1999).
Bernard et al.: "Labeled Radial Drawing of Data Structures" Proceedings of the Seventh International Conference on Information Visualization, Infovis. IEEE Symposium, Jul. 16-18, 2003, Piscataway, NJ, USA, IEEE, Jul. 16, 2003, pp. 479-484, XP010648809, IS.
Bier et al. "Toolglass and Magic Lenses: The See-Through Interface", Computer Graphics Proceedings, Proceedings of Siggraph Annual International Conference on Computer Graphics and Interactive Techniques, pp. 73-80, XP000879378 (Aug. 1993).
Boukhelifa et al., "A Model and Software System for Coordinated and Multiple Views in Exploratory Visualization," Information Visualization, No. 2, pp. 258-269, GB (2003).
C. Yip Chung et al., "Thematic Mapping—From Unstructured Documents To Taxonomies," CIKM'02, Nov. 4-9, 2002, pp. 608-610, ACM, McLean, Virginia, USA (Nov. 4, 2002).
Chen An et al., "Fuzzy Concept Graph And Application In Web Document Clustering," IEEE, pp. 101-106 (2001).
Davison et al., "Brute Force Estimation of the Number of Human Genes Using EST Clustering as a Measure," IBM Journal of Research & Development, vol. 45, pp. 439-447 (May 2001).
Eades et al. "Multilevel Visualization of Clustered Graphs," Department of Computer Science and Software Engineering, University of Newcastle, Australia, Proceedings of Graph Drawing '96, Lecture Notes in Computer Science, NR. 1190, Sep. 18, 1996—Se.
Eades et al., "Orthogonal Grid Drawing of Clustered Graphs," Department of Computer Science, the University of Newcastle, Australia, Technical Report 96-04, [Online] 1996, Retrieved from the internet: URL:http://citeseer.ist.psu.edu/eades96ort hogonal.ht.
Estivill-Castro et al. "Amoeba: Hierarchical Clustering Based On Spatial Proximity Using Delaunaty Diagram", Department of Computer Science, The University of Newcastle, Australia, 1999 ACM Sigmod International Conference on Management of Data, vol. 28, N.
F. Can, Incremental Clustering For Dynamic Information Processing: ACM Transactions On Information Systems, ACM, New York, NY, US, vol. 11, No. 2, pp. 143-164, XP-002308022 (Apr. 1993).
Fekete et al., "Excentric Labeling: Dynamic Neighborhood Labeling For Data Visualization," CHI 1999 Conference Proceedings Human Factors In Computing Systems, Pittsburgh, PA, pp. 512-519 (May 15-20, 1999).
http://em-ntserver.unl.edu/Math/mathweb/vecors/vectors.html © 1997.
Inxight VizServer, "Speeds and Simplifies The Exploration and Sharing of Information", www.inxight.com/products/vizserver, copyright 2005.
Jain et al., "Data Clustering: A Review," ACM Computing Surveys, vol. 31, No. 3, Sep. 1999, pp. 264-323, New York, NY, USA.
James Osborn et al., "JUSTICE: A Jidicial Search Tool Using Intelligent Cencept Extraction," Department of Computer Science and Software Engineering, University of Melbourne, Australia, ICAIL-99, 1999, pp. 173-181, ACM.
Jiang Linhui, "K-Mean Algorithm: Iterative Partitioning Clustering Algorithm," http://www.cs.regina.ca/-linhui/K.sub.—mean.sub.—algorithm.html, (2001) Computer Science Department, University of Regina, Saskatchewan, Canada.
Kanungo et al., "The Analysis Of A Simple K-Means Clustering Algorithm," pp. 100-109, Proc 16th annual symposium of computational geometry (May 2000).
Kawano, Hiroyuki., "Overview of Mondou Web Search Engine Using Text Mining And Information Visualizing Technologies," IEEE, 2001, pp. 234-241.
Kazumasa Ozawa, "A Stratificational Overlapping Cluster Scheme," Information Science Center, Osaka Electro-Communication University, Neyagawa-shi, Osaka 572, Japan, Pattern Recognition, vol. 18, pp. 279-286 (1985).
Kohonen, T., "Self-Organizing Maps," Ch. 1-2, Springer-Verlag (3rd ed.) (2001).
Kurimo M., "Fast Latent Semantic Indexing of Spoken Documents by Using Self-Organizing Maps" IEEE International Conference on Accoustics, Speech, And Signal Processing, vol. 6, pp. 2425-2428 (Jun. 2000).
Lam et al., "A Sliding Window Technique for Word Recognition," SPIE, vol. 2422, pp. 38-46, Center of Excellence for Document Analysis and Recognition, State University of New Yrok at Baffalo, NY, USA (1995).
Lio et al., "Funding Pathogenicity Islands And Gene Transfer Events in Genome Data," Bioinformatics, vol. 16, pp. 932-940, Department of Zoology, University of Cambridge, UK (Jan. 25, 2000).
Artero et al., "Viz3D: Effective Exploratory Visualization of Large Multidimensional Data Sets," IEEE Computer Graphics and Image Processing, pp. 340-347 (Oct. 20, 2004).
Magarshak, Greg., Theory & Practice. Issue 01. May 17, 2000. http://www.flipcode.com/articles/tp.sub.—issue01-pf.shtml.
Maria Cristin Ferreira de Oliveira et al., "From Visual Data Exploration to Visual Data Mining: A Survey," Jul.-Sep. 2003, IEEE Transactions on Visualization and Computer Graphics, vol. 9, No. 3, pp. 378-394 (Jul. 2003).
McNee, "Meeting User Information Needs in Recommender Systems," Ph.D. Dissertation, University of Minnesota-Twin Cities, (Jun. 2006).
Miller et al., "Topic Islands: A Wavelet Based Text Visualization System," Proceedings of the IEEE Visualization Conference. 1998, pp. 189-196.
North et al. "A Taxonomy of Multiple Window Coordinations," Institute for Systems Research & Department of Computer Science, University of Maryland, Maryland, USA, http://www.cs.umd.edu/localphp/hcil/tech-reports-search.php?number=97-18 (1997).
O'Neill et al., "DISCO: Intelligent Help for Document Review," 12th International Conference on Artificial Intelligence and Law, Barcelona, Spain, Jun. 8, 2009, pp. 1-10, ICAIL 2009, Association For Computing Machinery, Red Hook, New York (Online); XP 0026.
Pelleg et al., "Accelerating Exact K-Means Algorithms With Geometric Reasoning," pp. 277-281, Conf on Knowledge Discovery in Data, Proc fifth ACM SIGKDD (1999).
R.E. Horn, "Communication Units, Morphology, and Syntax," Visual Language: Global Communication for the 21st Century, 1998, Ch. 3, pp. 51-92, MacroVU Press, Bainbridge Island, Washington, USA.
Rauber et al., "Text Mining in the SOMLib Digital Library System: The Representation of Topics and Genres," Applied Intelligence 18, pp. 271-293, 2003 Kluwer Academic Publishers (2003).
Shuldberg et al., "Distilling Information from Text: The EDS TemplateFiller System," Journal of the American Society for Information Science, vol. 44, pp. 493-507 (1993).
Eades et al. "Multilevel Visualization of Clustered Graphs," Department of Computer Science and Software Engineering, University if Newcastle, Australia, Proceedings of Graph Drawing '96, Lecture Notes in Computer Science, NR. 1190, (Sep. 1996).
Eades et al., "Orthogonal Grid Drawing of Clustered Graphs," Department of Computer Science, the University of Newcastle, Australia, Technical Report 96-04, [Online] 1996, Retrieved from the internet: URL: http://citeseer.ist.psu.edu/eades96ort hogonal.html.
Estivill-Castro et al. "Amoeba: Hierarchical Clustering Based On Spatial Proximity Using Delaunaty Diagram", Department of Computer Science, The University of Newcastle, Australia, 1999 ACM Sigmod International Conference on Management of Data, vol. 28, No. 2, Jun. 1999, pp. 49-60, Philadelphia, PA, USA.
Ryall et al., "An Interactive Constraint-Based System For Drawing Graphs," UIST '97 Proceedings of the 10th Annual ACM Symposium on User Interface Software and Technology, pp. 97-104 (1997).
S.S. Weng, C.K. Liu, "Using text classification and multiple concepts to answer e-mails." Expert Systems with Applications, 26 (2004), pp. 529-543.

\* cited by examiner

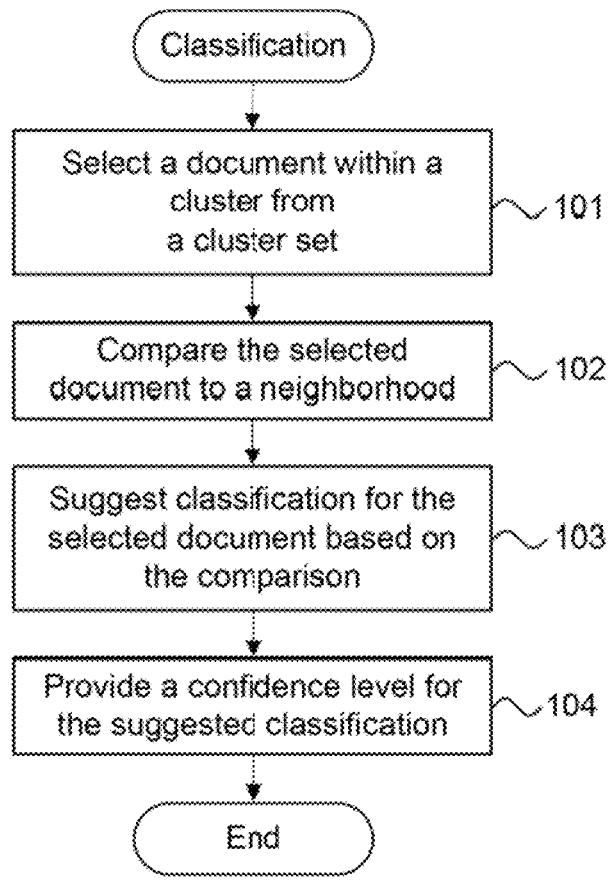

SYSTEM AND METHOD FOR DISPLAYING RELATIONSHIPS BETWEEN ELECTRONICALLY STORED INFORMATION TO PROVIDE CLASSIFICATION SUGGESTIONS VIA INCLUSION

CROSS-REFERENCE TO RELATED APPLICATION

This non-provisional patent application claims priority under 35 U.S.C. §119(e) to U.S. Provisional Patent Application Ser. No. 61/229,216, filed Jul. 28, 2009, and U.S. Provisional Patent Application Ser. No. 61/236,490, filed Aug. 24, 2009, the disclosures of which are incorporated by reference.

FIELD

This application relates in general to using electronically stored information as a reference point and, in particular, to a system and method for displaying relationships between electronically stored information to provide classification suggestions via inclusion.

BACKGROUND

Historically, document review during the discovery phase of litigation and for other types of legal matters, such as due diligence and regulatory compliance, have been conducted manually. During document review, individual reviewers, generally licensed attorneys, are assigned sets of documents for coding. A reviewer must carefully study each document and categorize the document by assigning a code or other marker from a set of descriptive classifications, such as "privileged," "responsive," and "non-responsive." The classifications can affect the disposition of each document, including admissibility into evidence.

During discovery, document review can potentially affect the outcome of the underlying legal matter, so consistent and accurate results are crucial. Manual document review is tedious and time-consuming. Marking documents is solely at the discretion of each reviewer and inconsistent results may occur due to misunderstanding, time pressures, fatigue, or other factors. A large volume of documents reviewed, often with only limited time, can create a loss of mental focus and a loss of purpose for the resultant classification. Each new reviewer also faces a steep learning curve to become familiar with the legal matter, classification categories, and review techniques.

Currently, with the increasingly widespread movement to electronically stored information (ESI), manual document review is no longer practicable. The often exponential growth of ESI exceeds the bounds reasonable for conventional manual human document review and underscores the need for computer-assisted ESI review tools.

Conventional ESI review tools have proven inadequate to providing efficient, accurate, and consistent results. For example, DiscoverReady LLC, a Delaware limited liability company, custom programs ESI review tools, which conduct semi-automated document review through multiple passes over a document set in ESI form. During the first pass, documents are grouped by category and basic codes are assigned. Subsequent passes refine and further assign codings. Multiple pass review requires a priori project-specific knowledge engineering, which is only useful for the single project, thereby losing the benefit of any inferred knowledge or know-how for use in other review projects.

Thus, there remains a need for a system and method for increasing the efficiency of document review that bootstraps knowledge gained from other reviews while ultimately ensuring independent reviewer discretion.

SUMMARY

Document review efficiency can be increased by identifying relationships between reference ESI and uncoded ESI and providing a suggestion for classification based on the relationships. The reference ESI and uncoded ESI are clustered based on a similarity of the ESI. The clusters and the relationship between the uncoded ESI and reference ESI within the clusters are visually depicted. The visual relationship of the uncoded ESI and reference ESI provide a suggestion regarding classification for the uncoded ESI.

An embodiment provides a system and method for identifying relationships between electronically stored information to provide a classification suggestion via inclusion. A set of reference electronically stored information items, each associated with a classification code, is designated. One or more of the reference electronically stored information items is combined with a set of uncoded electronically stored information items. Clusters of the uncoded electronically stored information items and the one or more reference electronically stored information items are generated. Relationships between the uncoded electronically stored information items and the one or more reference electronically stored information items in at least one cluster are visually depicted as suggestions for classifying the uncoded electronically stored information items in that cluster.

A further embodiment provides a system and method for clustering reference documents to generate suggestions for classification of uncoded documents. A set of reference documents, each associated with a classification, is designated. One or more of the reference documents are selected and combined with uncoded documents as a set of documents. Clusters of the documents in the document set are generated. A similarity between each document is determined. The documents are grouped into the clusters based on the similarity. At least one cluster having reference documents is identified. Relationships between the uncoded documents and the one or more reference documents in the at least one cluster are visually depicted as suggestions for classifying the uncoded electronically stored information items in that cluster.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 7 is a process flow diagram showing, by way of example, a method for classifying uncoded documents for use in the method of FIG. 2.

DETAILED DESCRIPTION

The ever-increasing volume of ESI underlies the need for automating document review for improved consistency and throughput. Previously coded ESI, known as reference ESI, offer knowledge gleaned from earlier work in similar legal projects, as well as a reference point for classifying uncoded ESI.

Providing Suggestions Using Reference Documents

Reference ESI is previously classified by content and can be used to influence classification of uncoded, that is unclassified, ESI. Specifically, relationships between the uncoded ESI and the reference ESI can be visually depicted to provide suggestions, for instance to a human reviewer, for classifying the visually-proximal uncoded ESI.

Figure 1:
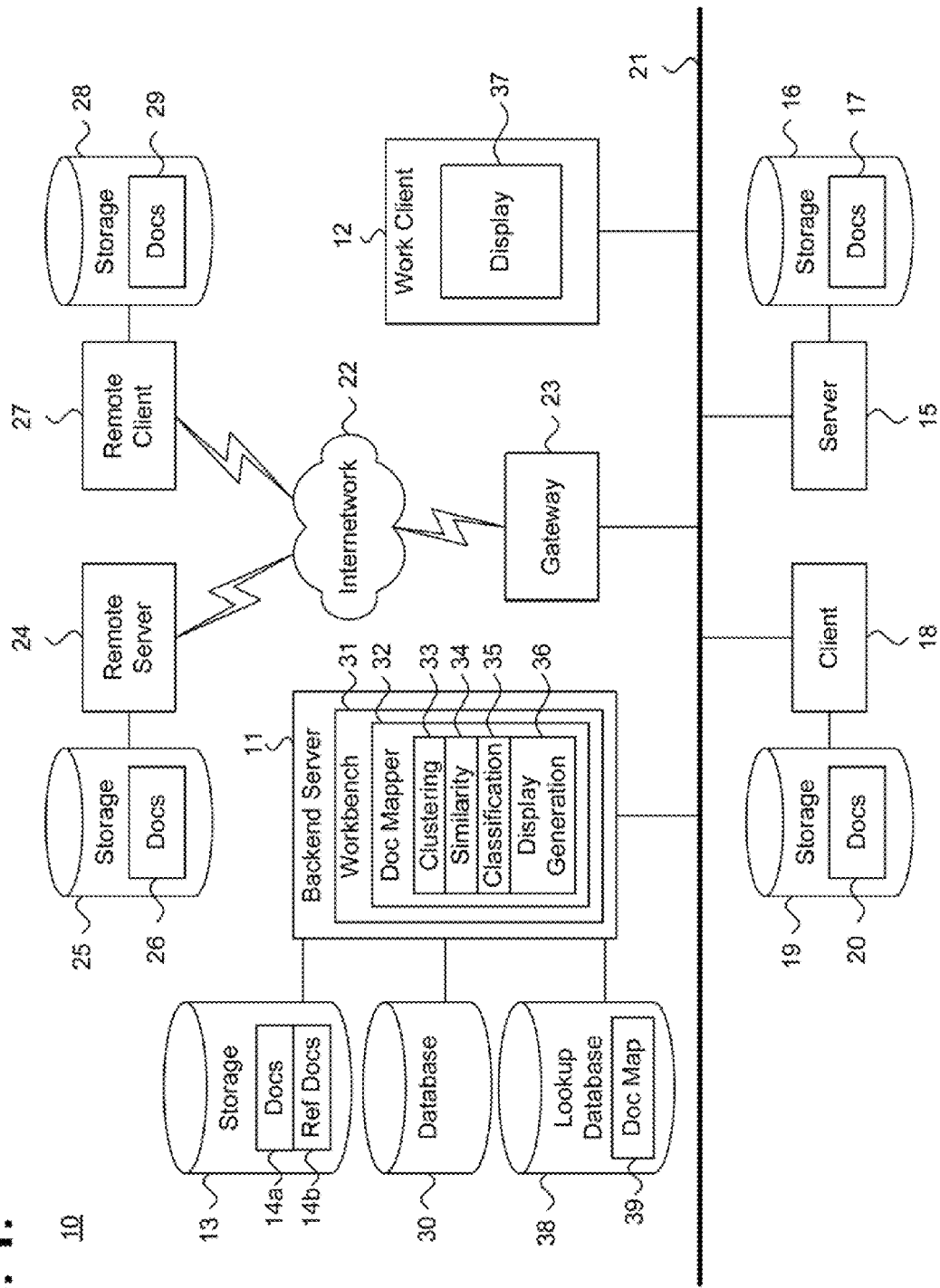
FIG. 1 is a block diagram showing a system for displaying relationships between electronically stored information to provide classification suggestions via inclusion, in accordance with one embodiment.

Complete ESI review requires a support environment within which classification can be performed. FIG. 1 is a block diagram showing a system 10 for displaying relationships between electronically stored information to provide classification suggestions via inclusion, in accordance with one embodiment. By way of illustration, the system 10 operates in a distributed computing environment, which includes a plurality of heterogeneous systems and ESI sources. Henceforth, a single item of ESI will be referenced as a "document," although ESI can include other forms of non-document data, as described infra. A backend server 11 is coupled to a storage device 13, which stores documents 14a, such as uncoded documents, in the form of structured or unstructured data, a database 30 for maintaining information about the documents, and a lookup database 38 for storing many-to-many mappings 39 between documents and document features, such as concepts. The storage device 13 also stores reference documents 14b, which can provide a training set of trusted and known results for use in guiding ESI classification. The reference documents 14b are each associated with an assigned classification code and considered as classified or coded. Hereinafter, the terms "classified" and "coded" are used interchangeably with the same intended meaning, unless otherwise indicated. A set of reference documents can be hand-selected or automatically selected through guided review, which is further discussed below. Additionally, the set of reference documents can be predetermined or can be generated dynamically, as uncoded documents are classified and subsequently added to the set of reference documents.

The backend server 11 is coupled to an intranetwork 21 and executes a workbench suite 31 for providing a user interface framework for automated document management, processing, analysis, and classification. In a further embodiment, the backend server 11 can be accessed via an internetwork 22. The workbench software suite 31 includes a document mapper 32 that includes a clustering engine 33, similarity searcher 34, classifier 35, and display generator 36. Other workbench suite modules are possible.

The clustering engine 33 performs efficient document scoring and clustering of uncoded documents and reference documents, such as described in commonly-assigned U.S. Pat. No. 7,610,313, the disclosure of which is incorporated by reference. Clusters of uncoded documents 14a and reference documents 14b are formed and organized along vectors, known as spines, based on a similarity of the clusters. The similarity can be expressed in terms of distance. Document clustering is further discussed below with reference to FIG. 4. The classifier 35 provides a machine-generated suggestion and confidence level for classification of selected uncoded documents 14b, clusters, or spines, as further described below with reference to FIG. 7.

Figure 2:
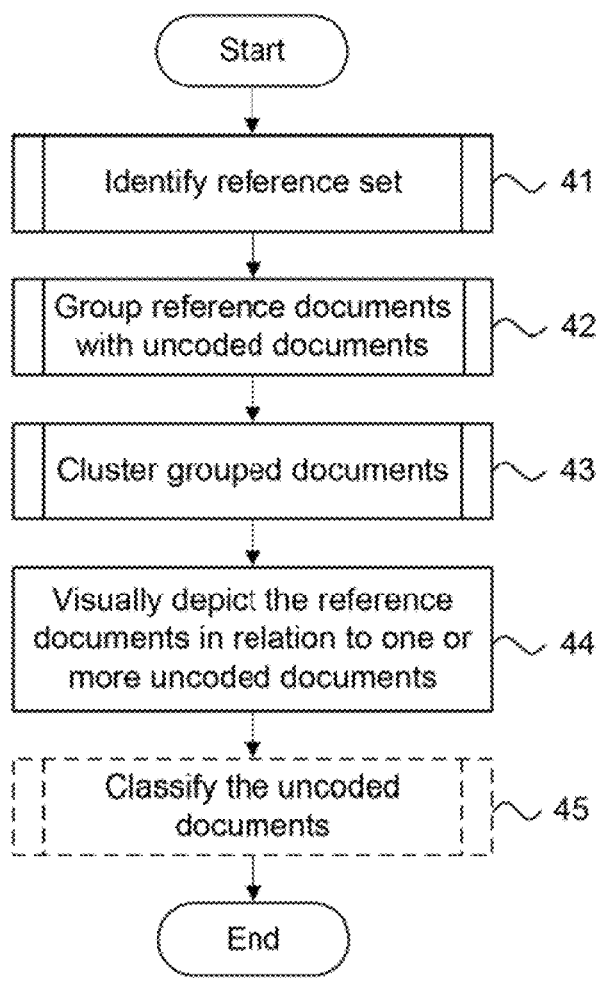
FIG. 2 is a process flow diagram showing a method for displaying relationships between electronically stored information to provide classification suggestions via inclusion, in accordance with one embodiment.

The display generator 36 arranges the clusters and spines in thematic relationships in a two-dimensional visual display space, as further described below beginning with reference to FIG. 2. Once generated, the visual display space is transmitted to a work client 12 by the backend server 11 via the document mapper 32 for presenting to a reviewer on a display 37. The reviewer can include an individual person who is assigned to review and classify one or more uncoded documents by designating a code. Hereinafter, the terms "reviewer" and "custodian" are used interchangeably with the same intended meaning, unless otherwise indicated. Other types of reviewers are possible, including machine-implemented reviewers.

The document mapper 32 operates on uncoded documents 14a, which can be retrieved from the storage 13, as well as from a plurality of local and remote sources. As well, the local and remote sources can also store the reference documents 14b. The local sources include documents 17 maintained in a storage device 16 coupled to a local server 15 and documents 20 maintained in a storage device 19 coupled to a local client 18. The local server 15 and local client 18 are interconnected to the backend server 11 and the work client 12 over an intranetwork 21. In addition, the document mapper 32 can identify and retrieve documents from remote sources over an internetwork 22, including the Internet, through a gateway 23 interfaced to the intranetwork 21. The remote sources include documents 26 maintained in a storage device 25 coupled to a remote server 24 and documents 29 maintained in a storage device 28 coupled to a remote client 27. Other document sources, either local or remote, are possible.

The individual documents 14a, 14b, 17, 20, 26, 29 include all forms and types of structured and unstructured ESI, including electronic message stores, word processing documents, electronic mail (email) folders, Web pages, and graphical or multimedia data. Notwithstanding, the documents could be in the form of structurally organized data, such as stored in a spreadsheet or database.

In one embodiment, the individual documents 14a, 14b, 17, 20, 26, 29 include electronic message folders storing email and attachments, such as maintained by the Outlook and Outlook Express products, licensed by Microsoft Corporation, Redmond, Wash. The database can be an SQL-based relational database, such as the Oracle database management system, Release 8, licensed by Oracle Corporation, Redwood Shores, Calif.

The individual documents 17, 20, 26, 29 can be designated and stored as uncoded documents or reference documents. One or more of the uncoded documents can be selected for a document review project and stored as a document corpus, as described infra. The reference documents are initially uncoded documents that can be selected from the corpus or other source of uncoded documents, and subsequently classified. The reference documents can assist in providing suggestions for classification of the remaining uncoded documents in the corpus based on visual relationships between the uncoded documents and reference documents. In a further embodiment, the reference documents can provide suggestions for classifying uncoded documents in a different corpus. In yet a further embodiment, the reference documents can be used as a training set to form machine-generated suggestions for classifying uncoded documents, as further described below with reference to FIG. 8.

The document corpus for a document review project can be divided into subsets of uncoded documents, which are each provided to a particular reviewer as an assignment. To maintain consistency, the same classification codes can be used across all assignments in the document review project. Alternatively, the classification codes can be different for each assignment. The classification codes can be determined using taxonomy generation, during which a list of classification codes can be provided by a reviewer or determined automatically. For purposes of legal discovery, the list of classification codes can include "privileged," "responsive," or "non-responsive;" however, other classification codes are possible. A "privileged" document contains information that is protected by a privilege, meaning that the document should not be disclosed or "produced" to an opposing party. Disclosing a "privileged" document can result in unintentional waivers of the subject matter disclosed. A "responsive" document contains information that is related to a legal matter on which the document review project is based and a "non-responsive" document includes information that is not related to the legal matter.

The system 10 includes individual computer systems, such as the backend server 11, work server 12, server 15, client 18, remote server 24 and remote client 27. The individual computer systems are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. The various implementations of the source code and object and byte codes can be held on a computer-readable storage medium, such as a floppy disk, hard drive, digital video disk (DVD), random access memory (RAM), read-only memory (ROM) and similar storage mediums. For example, program code, including software programs, and data are loaded into the RAM for execution and processing by the CPU and results are generated for display, output, transmittal, or storage.

Identifying relationships between the reference documents and uncoded documents includes clustering. FIG. 2 is a process flow diagram showing a method 40 for displaying relationships between electronically stored information to provide classification suggestions via inclusion, in accordance with one embodiment. A subset of reference documents is identified and selected (block 41) from a representative set of reference documents. The subset of reference documents can be predefined, arbitrary, or specifically selected, as discussed further below with reference to FIG. 3. Upon identification, the reference document subset is grouped with uncoded documents (block 42). The uncoded documents can include all uncoded documents in an assignment or in a corpus. The grouped documents, including uncoded and reference documents are organized into clusters (block 43). Clustering of the documents is discussed further below with reference to FIG. 4.

Once formed, the clusters can be displayed to visually depict relationships (block 44) between the uncoded documents and the reference documents. The relationships can provide a suggestion, which can be used by an individual reviewer for classifying one or more of the uncoded documents, clusters, or spines. Based on the relationships, the reviewer can classify the uncoded documents, clusters, or spines by assigning a classification code, which can represent a relevancy of the uncoded document to the document review project. Further, machine classification can provide a suggestion for classification, including a classification code, based on a calculated confidence level (block 45). Classifying uncoded documents is further discussed below with reference to FIG. 7.

Identifying a Set and Subset of Reference Documents

Prior to clustering, the uncoded documents and reference documents are obtained. The reference documents used for clustering can include a particular subset of reference documents, which are selected from a general set of reference documents. Alternatively, the entire set of reference documents can be clustered with the uncoded documents. The set of reference documents is representative of the document corpus for a document review project in which data organization or classification is desired. The reference document set can be previously defined and maintained for related document review projects or can be specifically generated for each review project. A predefined reference set provides knowledge previously obtained during the related document review project to increase efficiency, accuracy, and consistency. Reference sets newly generated for each review project can include arbitrary or customized reference sets that are determined by a reviewer or a machine.

The set of reference documents can be generated during guided review, which assists a reviewer in building a reference document set. During guided review, the uncoded documents that are dissimilar to the other uncoded documents are identified based on a similarity threshold. Other methods for determining dissimilarity are possible. Identifying a set of dissimilar documents provides a group of uncoded documents that is representative of the corpus for the document review project. Each identified dissimilar document is then classified by assigning a particular classification code based on the content of the document to collectively generate a set of reference documents. Guided review can be performed by a reviewer, a machine, or a combination of the reviewer and machine.

Other methods for generating a reference document set for a document review project using guided review are possible, including clustering. For example, a set of uncoded documents to be classified is clustered, as described in commonly-assigned U.S. Pat. No. 7,610,313, the disclosure of which is incorporated by reference. A plurality of the clustered uncoded documents are selected based on selection criteria, such as cluster centers or sample clusters. The cluster centers can be used to identify uncoded documents in a cluster that are most similar or dissimilar to the cluster center. The identified uncoded documents are then selected for classification by assigning classification codes. After classification, the documents represent a reference set. In a further embodiment, sample clusters can be used to generate a reference document set by selecting one or more sample clusters based on cluster relation criteria, such as size, content, similarity, or dissimilarity. The uncoded documents in the selected sample clusters are then assigned classification codes. The classified documents represent a document reference set for the document review project. Other methods for selecting documents for use as a reference set are possible.

Figure 3:
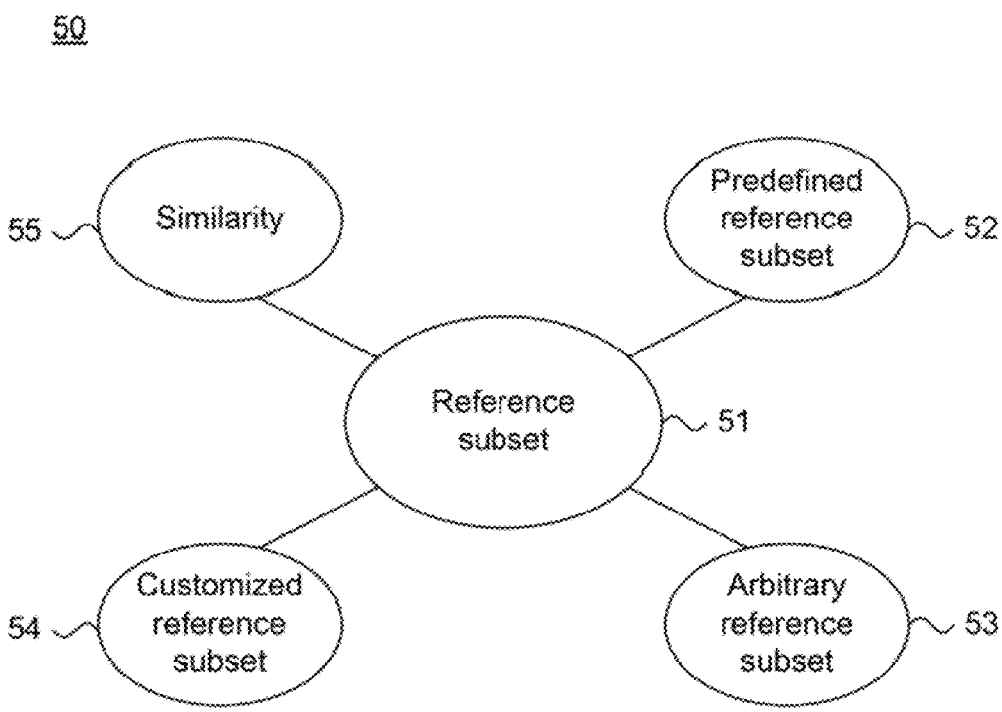
FIG. 3 is a block diagram showing, by way of example, measures for selecting reference document subsets for use in the method of FIG. 2.

Once generated, a subset of reference documents is selected from the reference document set for clustering with uncoded documents. FIG. 3 is a block diagram showing, by way of example, measures 50 for selecting reference document subsets 51 for use in the method of FIG. 2. A reference document subset 51 includes one or more reference documents selected from a set of reference documents associated with a document review project for use in clustering with uncoded documents. The reference document subset can be predefined 52, customized 54, selected arbitrarily 53, or based on similarity 55.

A subset of predefined reference documents 52 can be selected from a reference set, which is associated with another document review project that is related to the current document review project. An arbitrary reference subset 53 includes reference documents randomly selected from a reference set, which can be predefined or newly generated for the current document review project or a related document review project. A customized reference subset 54 includes reference documents specifically selected from a current or related reference set based on criteria, such as reviewer preference, classification category, document source, content, and review project. Other criteria are possible. The number of reference documents in a subset can be determined automatically or by a reviewer based on reference factors, such as a size of the document review project, an average size of the assignments, types of classification codes, and a number of reference documents associated with each classification code. Other reference factors are possible. In a further embodiment, the reference document subset can include more than one occurrence of a reference document. Other types of reference document subsets and methods for selecting the reference document subsets are possible.

Forming Clusters

Once identified, the reference document subset can be used for clustering with uncoded documents from a corpus associated with a particular document review project. The corpus of uncoded documents for a review project can be divided into assignments using assignment criteria, such as custodian or source of the uncoded document, content, document type, and date. Other criteria are possible. In one embodiment, each assignment is assigned to an individual reviewer for analysis. The assignments can be separately clustered with the reference document subset or alternatively, all of the uncoded documents in the corpus can be clustered with the reference document subset. The content of each uncoded document within the corpus can be converted into a set of tokens, which are word-level or character-level n-grams, raw terms, concepts, or entities. Other tokens are possible.

An n-gram is a predetermined number of items selected from a source. The items can include syllables, letters, or words, as well as other items. A raw term is a term that has not been processed or manipulated. Concepts typically include nouns and noun phrases obtained through part-of-speech tagging that have a common semantic meaning. Entities further refine nouns and noun phrases into people, places, and things, such as meetings, animals, relationships, and various other objects. Entities can be extracted using entity extraction techniques known in the field. Clustering of the uncoded documents can be based on cluster criteria, such as the similarity of tokens, including n-grams, raw terms, concepts, entities, email addresses, or other metadata.

Figure 4:
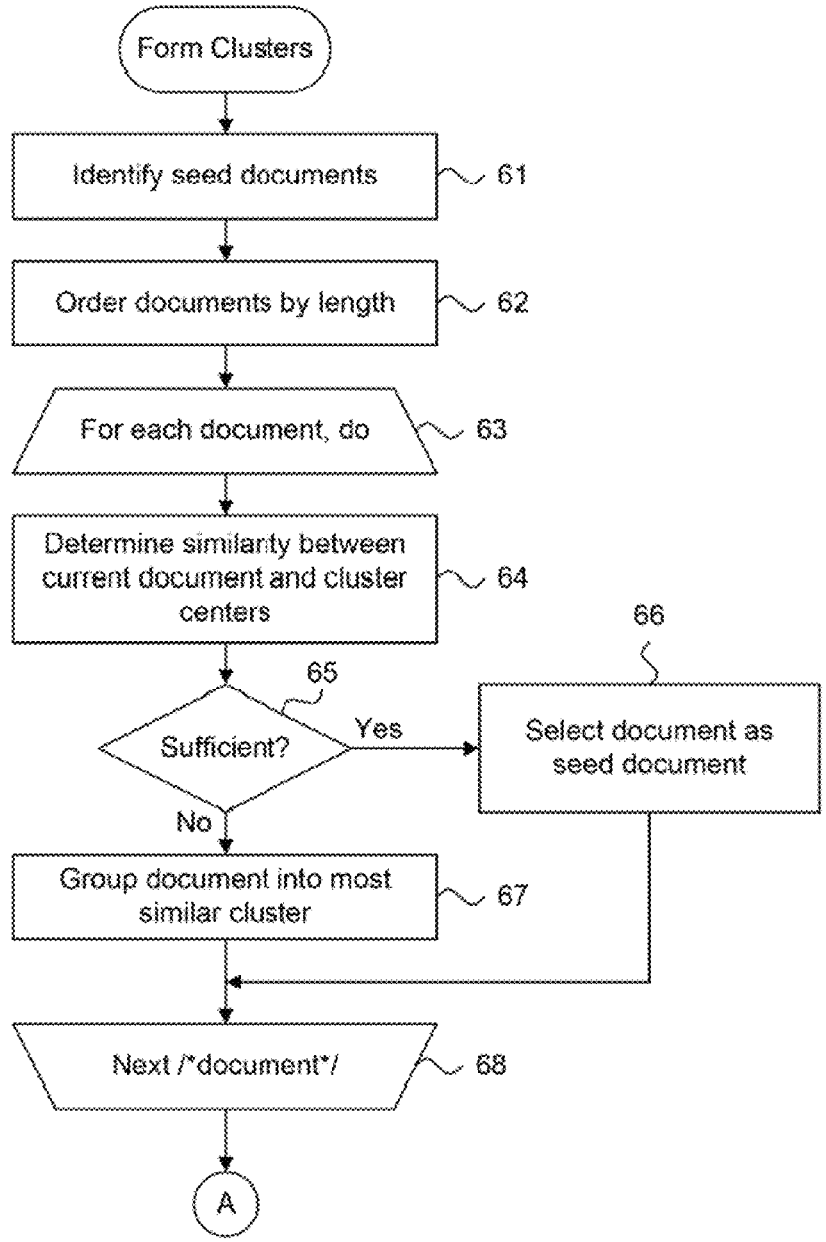
FIG. 4 is a process flow diagram showing, by way of example, a method for forming clusters for use in the method of FIG. 2.
Figure 4:
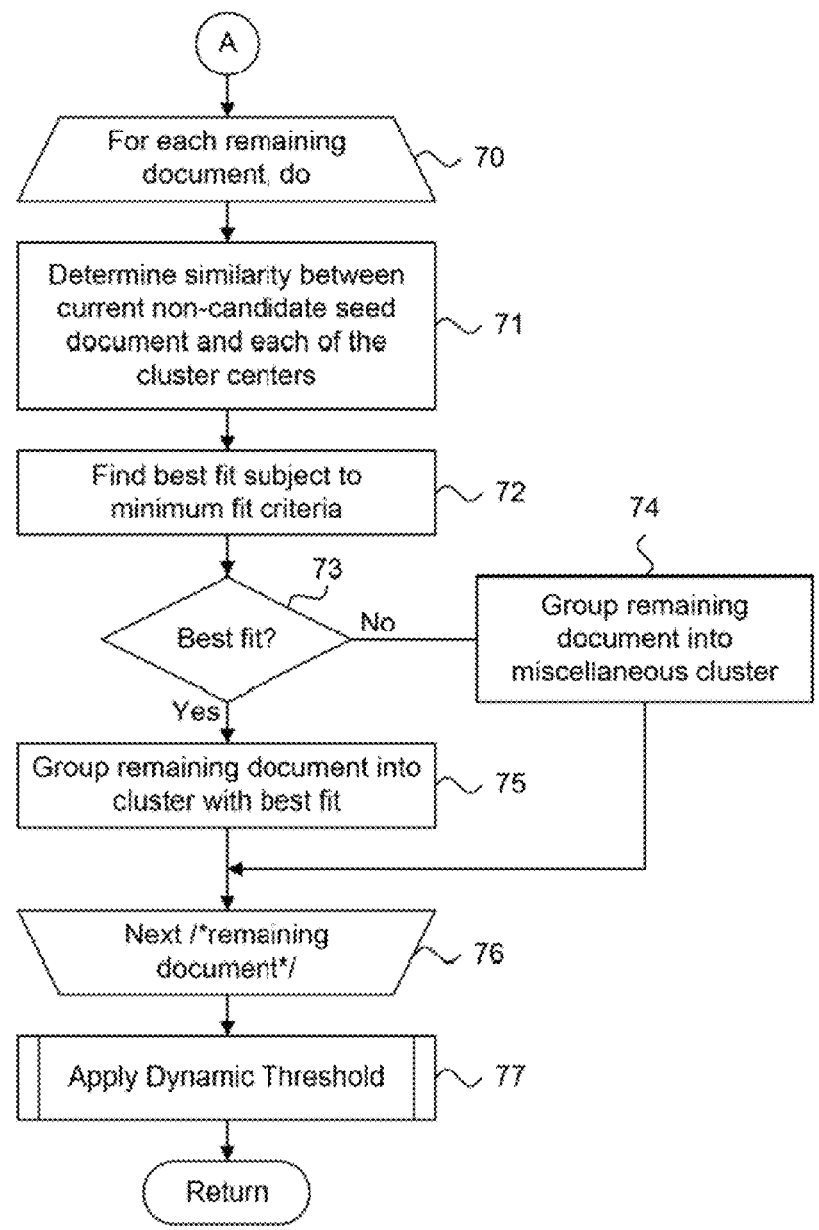

Clustering provides groupings of related uncoded documents and reference documents. FIG. 4 is a flow diagram showing a routine 60 for forming clusters for use in the method 40 of FIG. 2. The purpose of this routine is to use score vectors associated with the documents, including uncoded and reference documents, to form clusters based on relative similarity. Hereinafter, the term "document" is intended to include uncoded documents and reference documents selected for clustering, unless otherwise indicated. The score vector associated with each document includes a set of paired values for tokens identified in that document and weights, which are based on scores. The score vector is generated by scoring the tokens extracted from each uncoded document and reference document, as described in commonly-assigned U.S. Pat. No. 7,610,313, the disclosure of which is incorporated by reference.

As an initial step for generating score vectors, each token within a document is individually scored. Next, a normalized score vector is created for the document by identifying paired values, consisting of a token occurring in that document and the scores for that token. The paired values are ordered along a vector to generate the score vector. The paired values can be ordered based on the tokens, including concept or frequency, as well as other factors. For example, assume a normalized score vector for a first document A is $\vec{S}_A=\{(5, 0.5), (120, 0.75)\}$ and a normalized score vector for another document B is $\vec{S}_B=\{(3, 0.4), (5, 0.75), (47, 0.15)\}$. Document A has scores corresponding to tokens '5' and '120' and Document B has scores corresponding to tokens '3,' '5 ' and '47.' Thus, these documents only have token '5' in common. Once generated, the score vectors can be compared to determine similarity or dissimilarity between the corresponding documents during clustering.

The routine for forming clusters of documents, including uncoded documents and reference documents, proceeds in two phases. During the first phase (blocks 63-68), the documents are evaluated to identify a set of seed documents, which can be used to form new clusters. During the second phase (blocks 70-76), any documents not previously placed are evaluated and grouped into the existing clusters based on a best-fit criterion.

Initially, a single cluster is generated with one or more documents as seed documents and additional clusters of documents are added, if necessary. Each cluster is represented by a cluster center that is associated with a score vector, which is representative of the tokens in all the documents for that cluster. In the following discussion relating to FIG. 4, the tokens include concepts. However, other tokens are possible, as described supra. The cluster center score vector can be generated by comparing the score vectors for the individual documents in the cluster and identifying the most common concepts shared by the documents. The most common concepts and associated weights are ordered along the cluster center score vector. Cluster centers and thus, cluster center score vectors may continually change due to the addition and removal of documents during clustering.

During clustering, the documents are identified (block 61) and ordered by length (block 62). The documents can include all reference documents in a subset and one or more assignments of uncoded documents. Each document is then processed in an iterative processing loop (blocks 63-68) as follows. The similarity between each document and a center of each cluster is determined (block 64) as the cosine (cos) σ of the score vectors for the document and cluster being compared. The cos σ provides a measure of relative similarity or dissimilarity between tokens, including the concepts, in the documents and is equivalent to the inner products between the score vectors for the document and cluster center.

In the described embodiment, the cos σ is calculated in accordance with the equation:

$$\cos\sigma_{AB} = \frac{\langle \vec{S}_A \cdot \vec{S}_B \rangle}{|\vec{S}_A||\vec{S}_B|}$$

where cos $\sigma_{AB}$ comprises the similarity metric between document A and cluster center B, $\vec{S}_A$ comprises a score vector for the document A, and $\vec{S}_B$ comprises a score vector for the cluster center B. Other forms of determining similarity using a distance metric are feasible, as would be recognized by one skilled in the art. An example includes using Euclidean distance.

Only those documents that are sufficiently distinct from all cluster centers (block 65) are selected as seed documents for forming new clusters (block 66). If the document being compared is not sufficiently distinct (block 65), the document is then grouped into a cluster with the most similar cluster center (block 67). Processing continues with the next document (block 68).

In the second phase, each document not previously placed is iteratively processed in an iterative processing loop (blocks 70-76) as follows. Again, the similarity between each remaining document and each of the cluster centers is determined based on a distance (block 71), such as the cos σ of the normalized score vectors for each of the remaining documents and the cluster centers. A best fit between a remaining document and a cluster center can be found subject to a minimum fit criterion (block 72). In the described embodiment, a minimum fit criterion of 0.25 is used, although other minimum fit criteria could be used. If a best fit is found (block 73), the remaining document is grouped into the cluster having the best fit (block 75). Otherwise, the remaining document is grouped into a miscellaneous cluster (block 74). Processing continues with the next remaining document (block 76). Finally, a dynamic threshold can be applied to each cluster (block 77) to evaluate and strengthen document membership in a particular cluster. The dynamic threshold is applied based on a cluster-by-cluster basis, as described in commonly-assigned U.S. Pat. No. 7,610,313, the disclosure of which is incorporated by reference. The routine then returns. Other methods and processes for forming clusters are possible.

Displaying the Reference Documents

Once formed, the clusters of documents can be can be organized to generate spines of thematically related clusters, as described in commonly-assigned U.S. Pat. No. 7,271,804, the disclosure of which is incorporated by reference. Each spine includes those clusters that share one or more tokens, such as concepts, which are placed along a vector. Also, the cluster spines can be positioned in relation to other cluster spines based on a theme shared by those cluster spines, as described in commonly-assigned U.S. Pat. No. 7,610,313, the disclosure of which is incorporated by reference. Each theme can include one or more concepts defining a semantic meaning. Organizing the clusters into spines and groups of cluster spines provides an individual reviewer with a display that presents the documents according to a theme while maximizing the number of relationships depicted between the documents.

Figure 5:
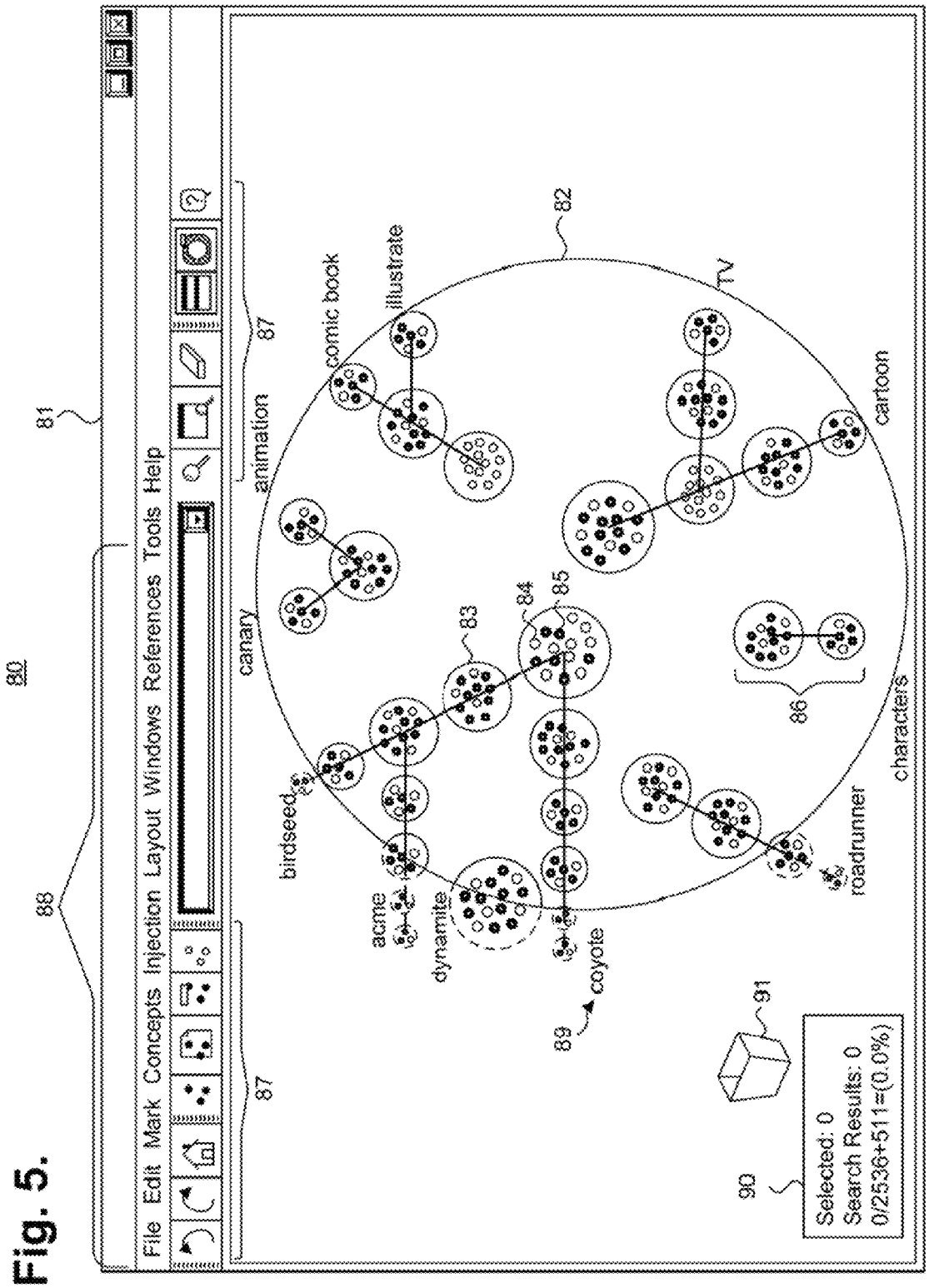
FIG. 5 is a screenshot showing, by way of example, a visual display of reference documents in relation to uncoded documents.

FIG. 5 is a screenshot 80 showing, by way of example, a visual display 81 of reference documents 85 in relation to uncoded documents 84. Clusters 83 can be located along a spine, which is a straight vector, based on a similarity of the documents 84, 85 in the clusters 83. Each cluster 83 is represented by a circle; however, other shapes, such as squares, rectangles, and triangles are possible, as described in U.S. Pat. No. 6,888,548, the disclosure of which is incorporated by reference. The uncoded documents 84 are each represented by a smaller circle within the clusters 83, while the reference documents 85 are each represented by a circle having a diamond shape within the boundaries of the circle. The reference documents 85 can be further represented by their assigned classification code. The classification codes can include "privileged," "responsive," and "non-responsive" codes, as well as other codes. Each group of reference documents associated with a particular classification code can be identified by a different color. For instance, "privileged" reference documents can be colored blue, while "non-responsive" reference documents are red and "responsive" reference documents are green. In a further embodiment, the reference documents for different classification codes can include different symbols. For example, "privileged" reference documents can be represented by a circle with an "X" in the center, while "non-responsive" reference documents can include a circle with striped lines and "responsive" reference documents can include a circle with dashed lines. Other classification representations for the reference documents are possible. Each cluster spine 86 is represented as a straight vector along which the clusters are placed.

The display 81 can be manipulated by an individual reviewer via a compass 82, which enables the reviewer to navigate, explore, and search the clusters 83 and spines 86 appearing within the compass 82, as further described in commonly-assigned U.S. Pat. No. 7,356,777, the disclosure of which is incorporated by reference. Visually, the compass 82 emphasizes clusters 83 located within the compass 82, while deemphasizing clusters 83 appearing outside of the compass 82.

Spine labels 89 appear outside of the compass 82 at an end of each cluster spine 86 to connect the outermost cluster of a cluster spine 86 to the closest point along the periphery of the compass 82. In one embodiment, the spine labels 89 are placed without overlap and circumferentially around the compass 82. Each spine label 89 corresponds to one or more concepts that most closely describe the cluster spines 86 appearing within the compass 82. Additionally, the cluster concepts for each of the spine labels 89 can appear in a concepts list (not shown) also provided in the display. Toolbar buttons 87 located at the top of the display 81 enable a user to execute specific commands for the composition of the spine groups displayed. A set of pull down menus 88 provide further control over the placement and manipulation of clusters 83 and cluster spines 86 within the display 81. Other types of controls and functions are possible.

A document guide 90 can be placed within the display 81. The document guide 90 can include a "Selected" field, a "Search Results" field, and details regarding the numbers of uncoded documents and reference documents provided in the display. The number of uncoded documents includes all uncoded documents selected for clustering, such as within a corpus of uncoded documents for a review project or within an assignment. The number of reference documents includes the reference document subset selected for clustering. The "Selected" field in the document guide 90 provides a number of documents within one or more clusters selected by the reviewer. The reviewer can select a cluster by "double clicking" the visual representation of that cluster using a mouse. The "Search Results" field provides a number of uncoded documents and reference documents that include a particular search term identified by the reviewer in a search query box 92.

In one embodiment, a garbage can 91 is provided to remove tokens, such as cluster concepts, from consideration in the current set of clusters 83. Removed cluster concepts prevent those concepts from affecting future clustering, as may occur when a reviewer considers a concept irrelevant to the clusters 83.

Figure 6A:
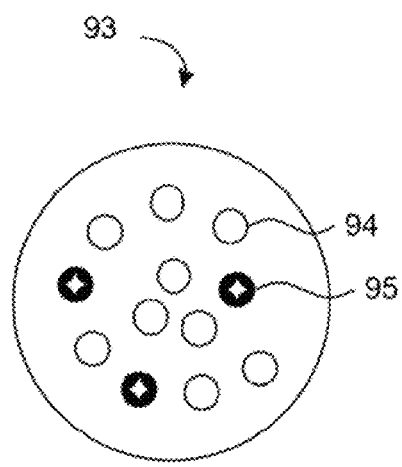
FIG. 6A is a block diagram showing, by way of example, a cluster with "privileged" reference documents and uncoded documents.

The display 81 provides a visual representation of the relationships between thematically-related documents, including the uncoded documents and reference documents. The uncoded documents and reference documents located within a cluster or spine can be compared based on characteristics, such as the assigned classification codes of the reference documents, a number of reference documents associated with each classification code, and a number of different classification codes to identify relationships between the uncoded documents and reference documents. The reviewer can use the displayed relationships as suggestions for classifying the uncoded documents. For example, FIG. 6A is a block diagram showing, by way of example, a cluster 93 with "privileged" reference documents 95 and uncoded documents 94. The cluster 93 includes nine uncoded documents 94 and three reference documents 95. Each reference document 95 is classified as "privileged." Accordingly, based on the number of "privileged" reference documents 95 present in the cluster 93, the absence of other classifications of reference documents, and the thematic relationship between the uncoded documents 94 and the "privileged" reference documents 95, the reviewer may be more inclined to review the uncoded documents 94 in that cluster 93 or to classify one or more of the uncoded documents 94 as "privileged" without review.

Figure 6B:
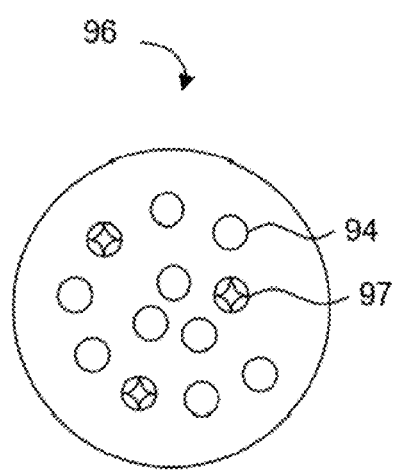
FIG. 6B is a block diagram showing, by way of example, a cluster with "non-responsive" reference documents and uncoded documents.

Alternatively, the three reference documents can be classified as "non-responsive," instead of "privileged" as in the previous example. FIG. 6B is a block diagram showing, by way of example, a cluster 96 with "non-responsive" reference documents 97 and uncoded documents 94. The cluster 96 includes nine uncoded documents 94 and three "non-responsive" documents 97. Since the uncoded documents 94 in the cluster are thematically related to the "non-responsive" reference documents 97, the reviewer may wish to assign a "non-responsive" code to one or more of the uncoded documents 94 without review, as they are most likely not relevant to the legal matter associated with the document review project. In making a decision to assign a code, such as "non-responsive," the reviewer can consider the number of "non-responsive" reference documents in the cluster, the presence or absence of other reference document classification codes, and the thematic relationship between the "non-responsive" reference documents and the uncoded documents. Thus, the presence of the three "non-responsive" reference documents 97 in the cluster provides a suggestion that the uncoded documents 94 may also be "non-responsive." Further, the label 89 associated with the spine 86 upon which the cluster is located can also be used to influence a suggestion.

Figure 6C:
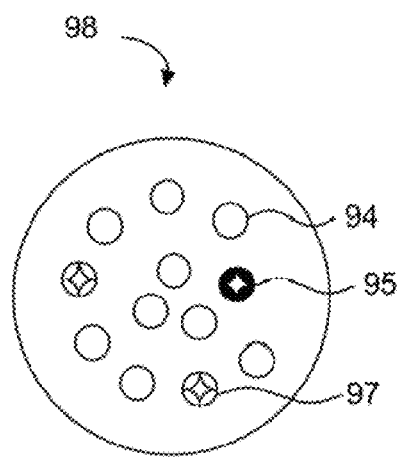
FIG. 6C is a block diagram showing, by way of example, a cluster with uncoded documents and a combination of differently classified reference documents.

A further example can include a cluster with combination of "privileged" and "non-responsive" reference documents. For example, FIG. 6C is a block diagram showing, by way of example, a cluster 98 with uncoded documents 94 and a combination of differently classified reference documents 95, 97. The cluster 98 can include one "privileged" reference document 95, two "non-responsive" reference documents 97, and nine uncoded documents 94. The "privileged" 95 and "non-responsive" 97 reference documents can be distinguished by different colors or shape, as well as other identifiers. The combination of "privileged" 95 and "non-responsive" 97 reference documents within the cluster 98 can suggest to a reviewer that the uncoded reference documents 94 should be reviewed before classification or that one or more uncoded reference documents 94 should be classified as "non-responsive" based on the higher number of "non-responsive" reference documents 97 in the cluster 98. In making a classification decision, the reviewer may consider the number of "privileged" reference documents 95 versus the number of "non-responsive" reference documents 97, as well as the thematic relationships between the uncoded documents 94 and the "privileged" 95 and "non-responsive" 97 reference documents. Additionally, the reviewer can identify the closest reference document to an uncoded document and assign the classification code of the closest reference document to the uncoded document. Other examples, classification codes, and combinations of classification codes are possible.

Additionally, the reference documents can also provide suggestions for classifying clusters and spines. The suggestions provided for classifying a cluster can include factors, such as a presence or absence of classified documents with different classification codes within the cluster and a quantity of the classified documents associated with each classification code in the cluster. The classification code assigned to the cluster is representative of the documents in that cluster and can be the same as or different from one or more classified documents within the cluster. Further, the suggestions provided for classifying a spine include factors, such as a presence or absence of classified documents with different classification codes within the clusters located along the spine and a quantity of the classified documents for each classification code. Other suggestions for classifying documents, clusters, and spines are possible.

Classifying Uncoded Documents

The display of relationships between the uncoded documents and reference documents provides suggestion to an individual reviewer. The suggestions can indicate a need for manual review of the uncoded documents, when review may be unnecessary, and hints for classifying the uncoded documents. Additional information can be generated to assist the reviewer in making classification decisions for the uncoded documents, such as a machine-generated confidence level associated with a suggested classification code, as described in common-assigned U.S. Patent Application Publication Ser. No. 2011/0029525, published Feb. 3, 2011, pending, the disclosure of which is incorporated by reference.

The machine-generated suggestion for classification and associated confidence level can be determined by a classifier. FIG. 7 is a process flow diagram 100 showing, by way of example, a method for classifying uncoded documents by a classifier for use in the method of FIG. 2. An uncoded document is selected from a cluster within a cluster set (block 101) and compared to a neighborhood of x-reference documents (block 102), also located within the cluster, to identify those reference documents that are most relevant to the selected uncoded document. In a further embodiment, a machine-generated suggestion for classification and an associated confidence level can be provided for a cluster or spine by selecting and comparing the cluster or spine to a neighborhood of x-reference documents determined for the selected cluster or spine.

The neighborhood of x-reference documents is determined separately for each selected uncoded document and can include one or more reference documents within that cluster. During neighborhood generation, an x number of reference documents is first determined automatically or by an individual reviewer. Next, the x-number of reference documents nearest in distance to the selected uncoded document are identified. Finally, the identified x-number of reference documents are provided as the neighborhood for the selected uncoded document. In a further embodiment, the x-number of reference documents are defined for each classification code, rather than across all classification codes. Once generated, the x-number of reference documents in the neighborhood and the selected uncoded document are analyzed by the classifier to provide a machine-generated classification suggestion (block 103). A confidence level for the suggested classification is also provided (block 104).

The analysis of the selected uncoded document and x-number of reference documents can be based on one or more routines performed by the classifier, such as a nearest neighbor (NN) classifier. The routines for determining a suggested classification code include a minimum distance classification measure, also known as closest neighbor, minimum average distance classification measure, maximum count classification measure, and distance weighted maximum count classification measure. The minimum distance classification measure includes identifying a neighbor that is the closest distance to the selected uncoded document and assigning the classification code of the closest neighbor as the suggested classification code for the selected uncoded document. The closest neighbor is determined by comparing the score vectors for the selected uncoded document with each of the x-number of reference documents in the neighborhood as the cos σ to determine a distance metric. The distance metrics for the x-number of reference documents are compared to identify the reference document closest to the selected uncoded document as the closest neighbor.

The minimum average distance classification measure includes calculating an average distance of the reference documents in a cluster for each classification code. The classification code with the reference documents having the closest average distance to the selected uncoded document is assigned as the suggested classification code. The maximum count classification measure, also known as the voting classification measure, includes counting a number of reference documents within the cluster for each classification code and assigning a count or "vote" to the reference documents based on the assigned classification code. The classification code with the highest number of reference documents or "votes" is assigned to the selected uncoded document as the suggested classification. The distance weighted maximum count classification measure includes identifying a count of all reference documents within the cluster for each classification code and determining a distance between the selected uncoded document and each of the reference documents. Each count assigned to the reference documents is weighted based on the distance of the reference document from the selected uncoded document. The classification code with the highest count, after consideration of the weight, is assigned to the selected uncoded document as the suggested classification.

The machine-generated classification code is provided for the selected uncoded document with a confidence level, which can be presented as an absolute value or a percentage. Other confidence level measures are possible. The reviewer can use the suggested classification code and confidence level to assign a classification to the selected uncoded document. Alternatively, the x-NN classifier can automatically assign the suggested classification. In one embodiment, the x-NN classifier only assigns an uncoded document with the suggested classification code if the confidence level is above a threshold value, which can be set by the reviewer or the x-NN classifier.

Classification can also occur on a cluster or spine level. For instance, for cluster classification, a cluster is selected and a score vector for the center of the cluster is determined as described above with reference to FIG. 4. A neighborhood for the selected cluster is determined based on a distance metric. The x-number of reference documents that are closest to the cluster center can be selected for inclusion in the neighborhood, as described above. Each reference document in the selected cluster is associated with a score vector and the distance is determined by comparing the score vector of the cluster center with the score vector of each reference document to determine an x-number of reference documents that are closest to the cluster center. However, other methods for generating a neighborhood are possible. Once determined, one of the classification measures is applied to the neighborhood to determine a suggested classification code and confidence level for the selected cluster.

Figure 8:
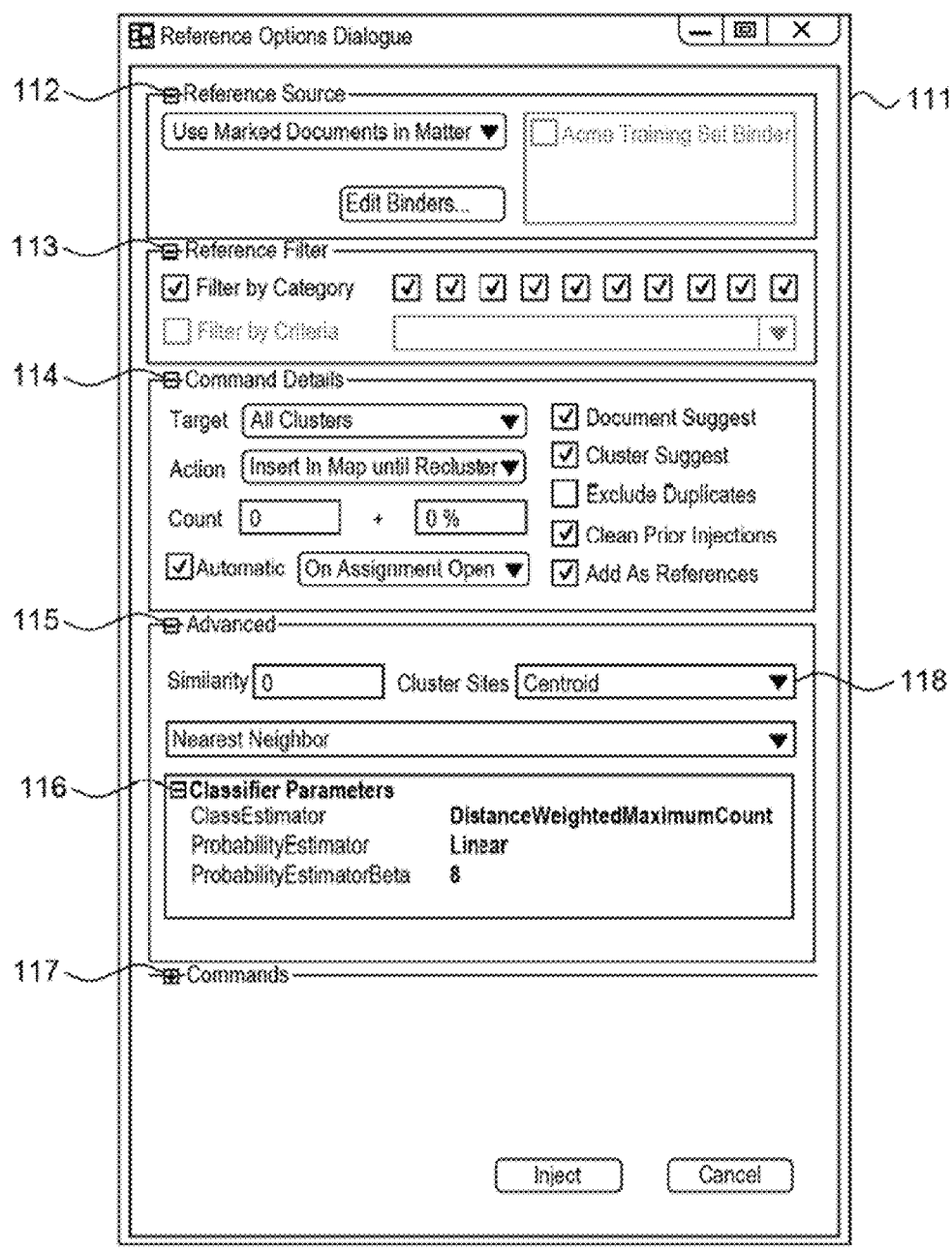
FIG. 8 is a screenshot showing, by way of example, a reference options dialogue box for entering user preferences for clustering documents.

During classification, either by an individual reviewer or a machine, the reviewer can retain control over many aspects, such as a source of the reference documents and a number of reference documents to be selected. FIG. 8 is a screenshot 110 showing, by way of example, an options dialogue box 111 for entering user preferences for clustering and display of the uncoded documents and reference documents. The dialogue box 111 can be accessed via a pull-down menu as described above with respect to FIG. 5. Within the dialogue box 111, the reviewer can utilize user-selectable parameters to define a reference source 112, category filter 113, command details 114, advanced options 115, classifier parameters 116, and commands 117. Each user-selectable option can include a text box for entry of a user preference or a drop-down menu with predetermined options for selection by the reviewer. Other user-selectable options and displays are possible.

The reference source parameter 112 allows the reviewer to identify one or more sources of the reference documents. The sources can include all reference documents for which the associated classification has been verified, all reference documents that have been analyzed, and all reference documents in a particular binder. The binder can include reference documents particular to a current document review project or that are related to a prior document review project. The category filter parameter 113 allows the reviewer to generate and display the subset of reference documents using only those reference documents associated with a particular classification code. Other options for generating the reference set are possible, including custodian, source, and content. The command parameters 114 allow the reviewer to enter instructions regarding actions for the uncoded and reference documents, such as indicating counts of the documents, and display of the documents. The advanced option parameters 115 allow the reviewer to specify clustering thresholds and classifier parameters. The parameters entered by the user can be compiled as command parameters 116 and provided in a drop-down menu on a display of the clusters. Other user selectable parameters, options, and actions are possible.

Providing suggestions for classification has been described in relation to uncoded documents and reference documents; however, in a further embodiment, suggestions can be provided for tokens extracted from the uncoded documents using reference tokens. For example, the uncoded tokens and reference tokens are clustered and displayed to provide classification suggestions based on relationships between the uncoded tokens and similar reference tokens. The uncoded documents can then be classified based on the classified tokens. In one embodiment, the tokens include concepts, n-grams, raw terms, and entities.

While the invention has been particularly shown and described as referenced to the embodiments thereof, those skilled in the art will understand that the foregoing and other changes in form and detail may be made therein without departing from the spirit and scope.

What is claimed is:

1. A system for providing reference items as a suggestion for classifying uncoded electronically stored information items, comprising:
    a set of reference electronically stored information items each associated with one of a plurality of classification codes and a visual representation of that classification code comprising at least one of a shape and a symbol, wherein the visual representation of each of the classification codes is different from the visual representations of the remaining classification codes;
    a set of uncoded electronically stored information items each associated with a visual representation different from the visual representations of the classification codes;
    a processor to execute modules, comprising:
        a clustering module to combine one or more of the coded reference electronically stored information items with the set of the uncoded electronically stored information items and to group the combined uncoded electronically stored information items and one or more coded reference electronically stored information items into clusters; and
    a display to visually depict relationships between the uncoded electronically stored information items and the one or more coded reference electronically stored information items in at least one of the clusters as suggestions for classifying the uncoded electronically stored information items in that cluster by displaying the visual representation associated with each of the coded reference electronically stored information items in that cluster and the visual representation associated with each of the uncoded electronically stored information items in that cluster.

2. A system according to claim 1, further comprising:
    a reference module to generate the set of reference electronically stored information items, comprising at least one of:
        a similarity module to identify dissimilar electronically stored information items for a document review project and to assign a classification code to each of the dissimilar electronically stored information items; and
        a reference clustering module to cluster electronically stored information items for a document review project, to select one or more of the electronically stored information items in at least one cluster, and to assign a classification code to each of the selected electronically stored information items.

3. A system according to claim 1, wherein the clusters are generated based on a similarity metric comprising forming a score vector for each uncoded electronically stored information item in the portion and each coded electronically stored information item in the reference set and calculating the similarity metric by comparing the score vectors for one of the uncoded electronically stored information items and one of the coded electronically stored information items in the reference set as an inner product.

4. A system according to claim 3, wherein the inner product is determined according to the following equation:

$$\cos\sigma_{AB} = \frac{\langle \vec{S}_A \cdot \vec{S}_B \rangle}{|\vec{S}_A||\vec{S}_B|}$$

where $\cos \sigma_{AB}$ comprises a similarity between uncoded electronically stored information item A and coded reference electronically stored information item B, $\vec{S}_A$ comprises a score vector for the uncoded electronically stored information item A, and $\vec{S}_B$ comprises a score vector for the coded reference electronically stored information item B.

5. A system according to claim 1, further comprising:
    a classification module to assign a classification code to one or more of the uncoded electronically stored information items in the at least one cluster.

6. A system according to claim 1, wherein each uncoded electronically stored information item in the at least one cluster is represented by a symbol in the display and each of the one or more coded reference electronically stored information items is represented by an additional symbol in the display, and further wherein the coded reference electronically stored information items associated with different classification codes are distinguished by assigning a different color to the different symbols.

7. A method for providing reference items as a suggestion for classifying uncoded electronically stored information items, comprising the steps of:
    designating a set of reference electronically stored information items each associated with one of a plurality of classification codes and a visual representation of that classification code comprising at least one of a shape and a symbol, wherein the visual representation of each of the classification codes is different from the visual representations of the remaining classification codes;
    obtaining a set of uncoded electronically stored information items each associated with a visual representation different from the visual representations of the classification codes;
    combining one or more of the coded reference electronically stored information items with the set of the uncoded electronically stored information items;
    grouping the combined uncoded electronically stored information items and one or more coded reference electronically stored information items into clusters; and
    visually depicting relationships between the uncoded electronically stored information items and one or more coded reference electronically stored information items in at least one of the clusters as suggestions for classifying the uncoded electronically stored information items in that cluster, comprising displaying the visual representation associated with each of the coded reference electronically stored information items in that cluster and the visual representation associated with each of the uncoded electronically stored information items in that cluster,
    wherein the steps are performed by a suitably programmed computer.

8. A method according to claim 7, further comprising:
    generating the set of reference electronically stored information items, comprising at least one of:
        identifying dissimilar electronically stored information items for a document review project and assigning a classification code to each of the dissimilar electronically stored information items; and clustering electronically stored information items for a document review project, selecting one or more of the electronically stored information items in at least one cluster and assigning a classification code to each of the selected electronically stored information items.

9. A method according to claim 7, wherein the clusters are generated based on a similarity metric, comprising:

forming a score vector for each uncoded electronically stored information item in the portion and each coded electronically stored information item in the reference set; and calculating the similarity metric by comparing the score vectors for one of the uncoded electronically stored information items and one of the electronically stored information items in the reference set as an inner product.

10. A method according to claim 9, wherein the inner product is determined according to the following equation:

$$\cos\sigma_{AB} = \frac{\langle \vec{S}_A \cdot \vec{S}_B \rangle}{|\vec{S}_A||\vec{S}_B|}$$

where $\cos\sigma_{AB}$ comprises a similarity between uncoded electronically stored information item A and coded reference electronically stored information item B, $\vec{S}_A$ comprises a score vector for the uncoded electronically stored information item A, $\vec{S}_B$ and comprises a score vector for the coded reference electronically stored information item B.

11. A method according to claim 7, further comprising:
assigning a classification code to one or more of the uncoded electronically stored information items in the at least one cluster.

12. A method according to claim 7, further comprising:
representing each uncoded electronically stored information item in the at least one cluster with a symbol; and
representing each of the one or more coded reference electronically stored information items with a different symbol; and
distinguishing the coded reference electronically stored information items associated with different classification codes by assigning a different color to the different symbols.

13. A system for clustering reference documents to generate suggestions for classification of uncoded documents, comprising:

a set of reference documents each associated with one of a plurality of classification codes and a visual representation of that classification code comprising at least one of a shape and a symbol, wherein the visual representation of each of the classification codes is different from the visual representations of the remaining classification codes;

a set of uncoded documents each associated with a visual representation different from the visual representations of the classification codes;

a processor to execute modules, comprising:
a clustering module to select one or more of the coded reference documents, to combine the one or more coded reference documents selected with the uncoded documents as a set of combined documents, and to group the combined set of documents into clusters, further comprising:

a cluster similarity module to determine a similarity between each document; and
a grouping module to group the documents into the clusters based on the similarity;

an identification module to identify at least one of the clusters with the coded reference documents; and a display to visually depict relationships between the uncoded documents and the one or more coded reference documents in the at least one cluster as suggestions for classifying the uncoded documents in that cluster by displaying the visual representation associated with each of the coded reference documents in that cluster and the visual representation associated with each of the uncoded documents in that cluster.

14. A system according to claim 13, further comprising:
a reference module to generate the set of reference documents, comprising at least one of:
a reference similarity module to identify dissimilar documents for a document review project and assign a classification code to each of the dissimilar documents; and
a reference cluster module to generate clusters of documents for a document review project, selecting one or more of the documents in at least one of the clusters and assigning a classification code to each of the documents.

15. A system according to claim 13, wherein the one or more coded reference documents are selected from at least one of a predefined, customized, or arbitrary reference document set.

16. A system according to claim 13, wherein the similarity is determined by forming a score vector for each uncoded document and each coded reference document and calculating a similarity metric between the score vectors for the uncoded documents and coded reference documents as an inner product.

17. A system according to claim 16, wherein the inner product is determined according to the following equation:

$$\cos\sigma_{AB} = \frac{\langle \vec{S}_A \cdot \vec{S}_B \rangle}{|\vec{S}_A||\vec{S}_B|}$$

where $\cos\sigma_{AB}$ comprises a similarity between uncoded document A and coded reference document B, $\vec{S}_A$ comprises a score vector for the uncoded document A, and $\vec{S}_B$ comprises a score vector for the coded reference document B.

18. A system according to claim 13, wherein each uncoded document in the at least one cluster is represented by a symbol and each coded reference document is represented by a different symbol, and further wherein the coded reference electronically stored information items associated with different classification codes are distinguished by different color assigned to the different symbols.

19. A method for clustering reference documents to generate suggestions for classification of uncoded documents, comprising the steps of:

designating a set of reference documents each associated with one of a plurality of classification codes and a visual representation of that classification code comprising at least one of a shape and a symbol, wherein the visual representation of each of the classification codes is different from the visual representations of the remaining classification codes;

obtaining a set of uncoded documents each associated with a visual representation different from the visual representations of the classification codes;

selecting one or more of the coded reference documents and combining the one or more coded reference documents selected with the uncoded documents as a set of combined documents;

grouping the combined set of documents into clusters, comprising:
- determining a similarity between each document; and
- grouping the documents into the clusters based on the similarity;

identifying at least one cluster of the clusters with the coded reference documents; and visually depicting relationships between the uncoded documents and the one or more coded reference documents in the at least one cluster as suggestions for classifying the uncoded documents in that cluster, comprising displaying the visual representation associated with each of the coded reference documents in that cluster and the visual representation associated with each of the uncoded documents in that cluster, wherein the steps are performed by a suitably programmed computer.

20. A method according to claim 19, further comprising:
generating the set of reference documents, comprising at least one of:
- identifying dissimilar documents for a document review project and assigning a classification code to each of the dissimilar documents; and
- generating clusters of documents for a document review project, selecting one or more of the documents in at least one of the clusters and assigning a classification code to each of the documents.

21. A method according to claim 19, wherein the one or more coded reference documents are selected from at least one of a predefined, customized, or arbitrary reference document set.

22. A method according to claim 19, further comprising:
determining the similarity, comprising:
- forming a score vector for each uncoded document and each coded reference document; and
- calculating a similarity metric between the score vectors for the uncoded documents and coded reference documents as an inner product.

23. A method according to claim 22, wherein the inner product is determined according to the following equation:

$$\cos\sigma_{AB} = \frac{\langle \vec{S}_A \cdot \vec{S}_B \rangle}{|\vec{S}_A||\vec{S}_B|}$$

where $\cos \sigma_{AB}$ comprises a similarity between uncoded document A and coded reference document B, $\vec{S}_A$ comprises a score vector for the uncoded document A, and $\vec{S}_B$ comprises a score vector for the coded reference document B.

24. A method according to claim 19, further comprising:
representing each uncoded document in the at least one cluster with a symbol; and
representing each coded reference document with a different symbol; and
distinguishing the coded reference documents with different classification codes with different colors of the different symbols.

* * * * *